US011491924B2

United States Patent
Skrocki

(10) Patent No.: US 11,491,924 B2
(45) Date of Patent: Nov. 8, 2022

(54) VEHICULAR CAMERA TEST SYSTEM USING TRUE AND SIMULATED TARGETS TO DETERMINE CAMERA DEFOCUS

(71) Applicant: Magna Electronics Inc., Auburn Hills, MI (US)

(72) Inventor: Gavin E. Skrocki, Bay City, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/448,252

(22) Filed: Sep. 21, 2021

(65) Prior Publication Data

US 2022/0089103 A1     Mar. 24, 2022

Related U.S. Application Data

(60) Provisional application No. 62/706,970, filed on Sep. 22, 2020.

(51) Int. Cl.
| | |
|---|---|
| *B60R 11/04* | (2006.01) |
| *H04N 5/365* | (2011.01) |
| *H04N 17/00* | (2006.01) |
| *B60R 11/00* | (2006.01) |

(52) U.S. Cl.
CPC ........... *B60R 11/04* (2013.01); *H04N 5/3656* (2013.01); *H04N 17/002* (2013.01); *B60R 2011/0026* (2013.01); *B60R 2300/105* (2013.01)

(58) Field of Classification Search
CPC ............. B60R 11/04; B60R 2011/0026; B60R 2300/105; H04N 5/3656; H04N 17/002; H04N 5/232121
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,720,580 B2 | 5/2010 | Higgins-Luthman |
| 7,855,755 B2 | 12/2010 | Weller et al. |
| 10,071,687 B2 | 9/2018 | Ihlenburg et al. |
| 10,099,614 B2 | 10/2018 | Diessner |
| 10,635,914 B2 | 4/2020 | Sesti et al. |
| 2002/0050988 A1 | 5/2002 | Petrov et al. |
| 2005/0089208 A1 | 4/2005 | Dong et al. |

(Continued)

*Primary Examiner* — Michael E Teitelbaum
(74) *Attorney, Agent, or Firm* — Honigman LLP

(57) ABSTRACT

A method for testing defocus of a camera includes providing a vehicular camera and providing a defocus tester that includes a first target disposed behind an optic and a second target that is not disposed behind the optic. The first target has a simulated image distance relative to the vehicular camera that is different than an actual image distance. The method includes positioning the defocus tester relative to the vehicular camera such that the vehicular camera views the defocus tester and images (i) light that has reflected off the first target and passed through the optic and (ii) light that has reflected off the second target and not passed through the optic. The method includes capturing image data with the vehicular camera that is representative of the first target and the second target and estimating a defocus of the vehicular camera responsive to processing the image data.

20 Claims, 9 Drawing Sheets

(56) References Cited

U.S. PATENT DOCUMENTS

| | | | |
|---|---|---|---|
| 2006/0038910 A1 | 2/2006 | Knoedgen et al. | |
| 2006/0038976 A1* | 2/2006 | Knoedgen | H04N 17/002 |
| | | | 356/10 |
| 2007/0211240 A1 | 9/2007 | Matsumoto et al. | |
| 2014/0152845 A1 | 6/2014 | Seger et al. | |
| 2014/0240518 A1* | 8/2014 | Lewinnek | H04N 17/002 |
| | | | 348/187 |
| 2015/0138372 A1 | 5/2015 | Apel et al. | |
| 2015/0277135 A1 | 10/2015 | Johnson | |
| 2017/0006282 A1 | 1/2017 | Sigle | |
| 2017/0132774 A1 | 5/2017 | Ruprecht et al. | |
| 2017/0234923 A1 | 8/2017 | Douglas et al. | |
| 2017/0287166 A1 | 10/2017 | Claveau et al. | |
| 2018/0113321 A1 | 4/2018 | Heshmat Dehkordi et al. | |
| 2018/0302615 A1 | 10/2018 | Lehmann et al. | |
| 2018/0373944 A1* | 12/2018 | Sesti | H04N 5/23212 |
| 2020/0204791 A1 | 6/2020 | Sesti et al. | |

* cited by examiner

VEHICULAR CAMERA TEST SYSTEM USING TRUE AND SIMULATED TARGETS TO DETERMINE CAMERA DEFOCUS

CROSS REFERENCE TO RELATED APPLICATION

The present application claims the filing benefits of U.S. provisional application Ser. No. 62/706,970, filed Sep. 22, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

Implementations herein include a testing system or method for a vehicular camera for a driver assistance system or vision system or imaging system for a vehicle. The testing system or method measures or estimates the defocus of the camera. A method includes providing a vehicular camera configured for use on a vehicle and providing a defocus tester. The defocus tester includes a first target disposed behind an optic and a second target that is not disposed behind the optic. The first target has a simulated image distance relative to the vehicular camera that is different than an actual image distance relative to the vehicular camera. The simulated image distance relative to the vehicular camera of the first target is different than an actual image distance of the second target relative to the vehicular camera. The method also includes positioning the defocus tester relative to the vehicular camera such that the vehicular camera views the defocus tester and images (i) light that has reflected off the first target disposed behind the optic and has passed through the optic and (ii) light that has reflected off the second target and has not passed through the optic. The method includes capturing image data with the vehicular camera. The captured image data is representative of the first target and the second target. The method also includes estimating a defocus of the vehicular camera responsive to processing, via an image processor, the image data captured by the vehicular camera with the defocus tester positioned such that the vehicular camera views the defocus tester.

These and other objects, advantages, purposes and features of the present invention will become apparent upon review of the following specification in conjunction with the drawings.

BRIEF DESCRIPTION OF THE DRAWINGS

FIGS. 3-7 are perspective views of another defocus tester;

DESCRIPTION OF THE PREFERRED EMBODIMENTS

A vehicle vision system and/or driver or driving assist system and/or object detection system and/or alert system operates to capture images interior or exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
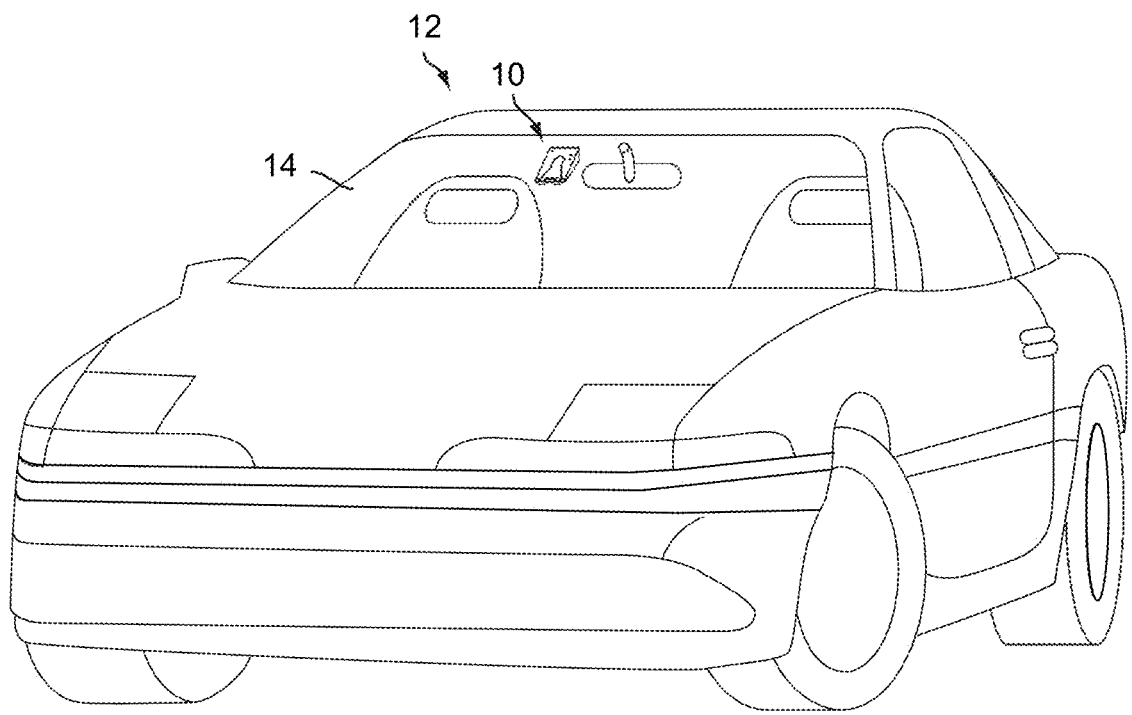
FIG. 1 is a plan view of a vehicle with a vision system that incorporates at least one camera.

Referring now to the drawings and the illustrative embodiments depicted therein, a vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. The forward viewing camera disposed at the windshield of the vehicle views through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) having electronic circuitry and associated software, with the electronic circuitry including a data processor or image processor that is operable to process image data captured by the camera or cameras, whereby the ECU may detect or determine presence of objects or the like and/or the system provide displayed images at a display device for viewing by the driver of the vehicle. The data transfer or signal communication from the camera to the ECU may comprise any suitable data or communication link, such as a vehicle network bus or the like of the equipped vehicle.

Defocus may be defined as an amount of distance a lens of a camera is incorrectly spaced apart from an imager of a camera that causes images captured by the camera to be out of focus. The greater the defocus, the greater the severity of blurring of the images and image data. For example, if an imager and lens are intended to be spaced apart 1 mm, but are instead spaced apart 1.01 mm, the camera has a defocus of −0.01 mm. In this case, the camera will not be in focus at the target distance. When testing cameras, such as interior and exterior vehicular cameras (FIG. 1), it is advantageous to simulate different target distances in order to determine or measure the defocus of a camera. Optics allow for the simulation of different image distances and thus may simulate different target distances (i.e., distances between the camera and a target object). In fact, optics may simulate target distances from millimeters to infinity and even theoretical negative distances.

Conventional techniques for measuring defocus include the use of a scanning optic. In this technique, an optic is attached to a motorized stage and placed between the camera being tested and an optical modulus transfer function (MTF) target (i.e., a focus target). The optic changes position (using the motorized stage) between the test camera and an MTF target to simulate different image distances. The MTF data may be curve-fit to obtain the test camera's defocus value. This is a slow testing technique, as the motorized stage must be operated to properly locate the camera relative to the target after each scan. Another conventional technique includes a scanning target. In this technique, an MTF target is attached to a motorized stage and placed behind an optic. In this scenario, the target changes position to simulate different image distances instead of the camera changing positions. The MTF data may be curve-fit to obtain the test camera's defocus value. This is also a slow testing technique for the same reasons as using a motorized stage to adjust the location of the camera.

In yet another conventional technique, the test camera is placed at the desired focal distance from an MTF target. The MTF target is measured without an optic. This process is repeated several times by placing different focal length optics in between the test camera and the MTF target to simulate different image distances (i.e., multiple optics). The MTF data is then curve-fit to obtain the test camera's defocus value. While potentially faster than the motorized stages, this technique still requires time to swap the optics.

The system and/or method described herein estimates the defocus of a camera using a scanner-less technique where multiple MTF targets are each placed at different distances behind an optic. Each MTF target provides a different image distance (simulated or actual). The MTF data is curve-fit to obtain the test camera's defocus value. This is a fast testing method and has no moving parts.

Optionally, a portion of the MTF targets do not have an optic in front of them. In this case, a portion of MTF targets have a simulated image distance (i.e., MTF targets with optics that simulate a distance from the camera that is different than the actual distance), while a different portion has a true image distance (i.e., MTF targets without optics that do not simulate a distance that is different than the actual distance). An optic has a minimum simulated image distance within its working distance (i.e., usable area behind the lens), where as an MTF target without an optic can get as close as the outer lens surface of the testing camera. This difference allows for a significantly larger defocus measurement range (i.e., from effectively zero to infinity). This is especially useful for cameras with small effective focal lengths and large depth of fields. The system also requires less testing time than motorized stages, scanning optics, scanning targets, and multiple optics. The system has an increased defocus test range compared to scanning targets and conventional scanner-less techniques. The system also provides increased possible camera application range over the conventional scanning target techniques, the multiple optic techniques, and the scanner-less techniques. Additionally the system provides increased durability over the conventional scanning optic techniques, the scanning target techniques, and the multiple optic techniques due to, for example, the lack of moving parts. The system may also easily measure the defocus of multiple regions of a test camera image.

Figure 2:
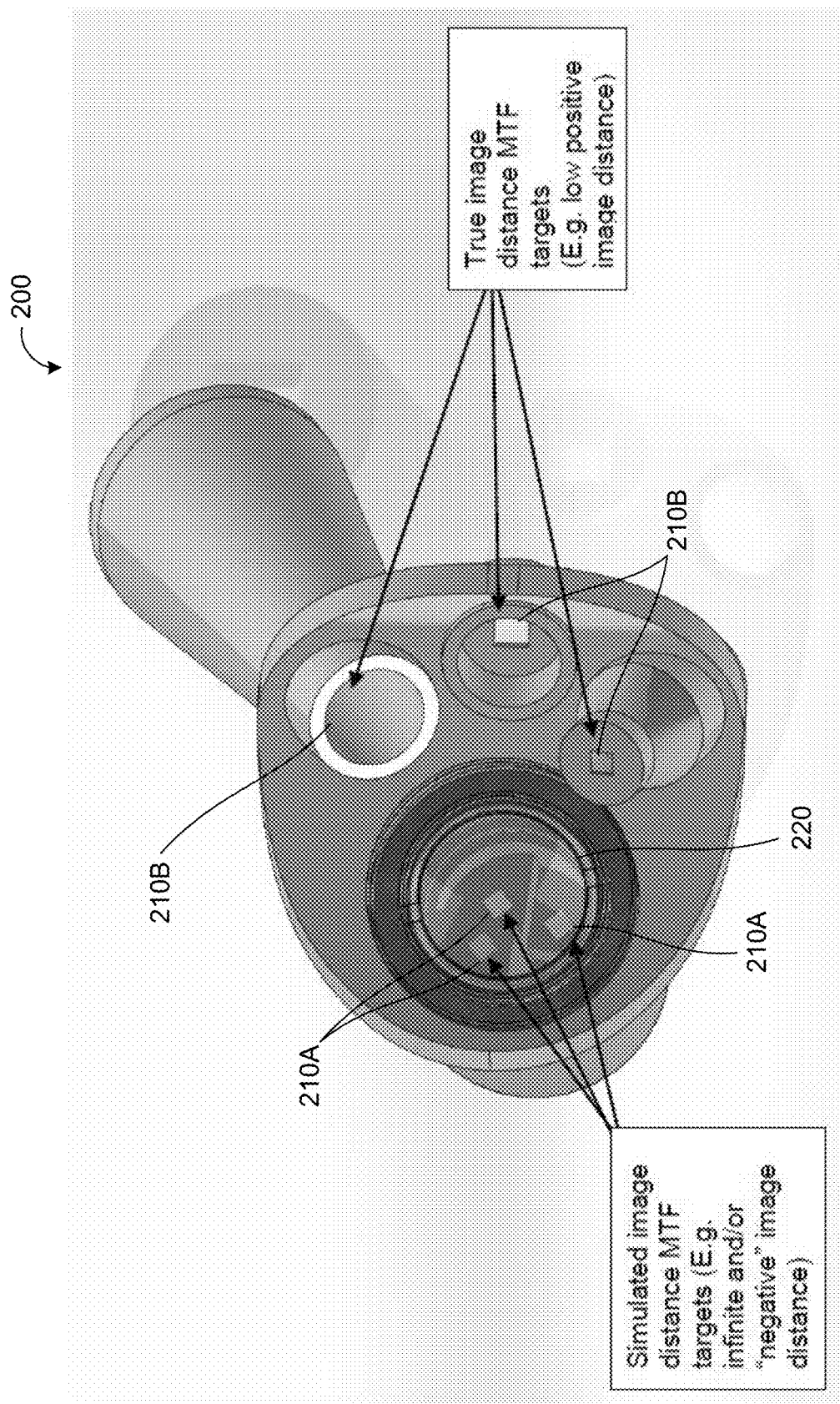
FIG. 2 is a perspective view of a defocus tester.
Figure 3:
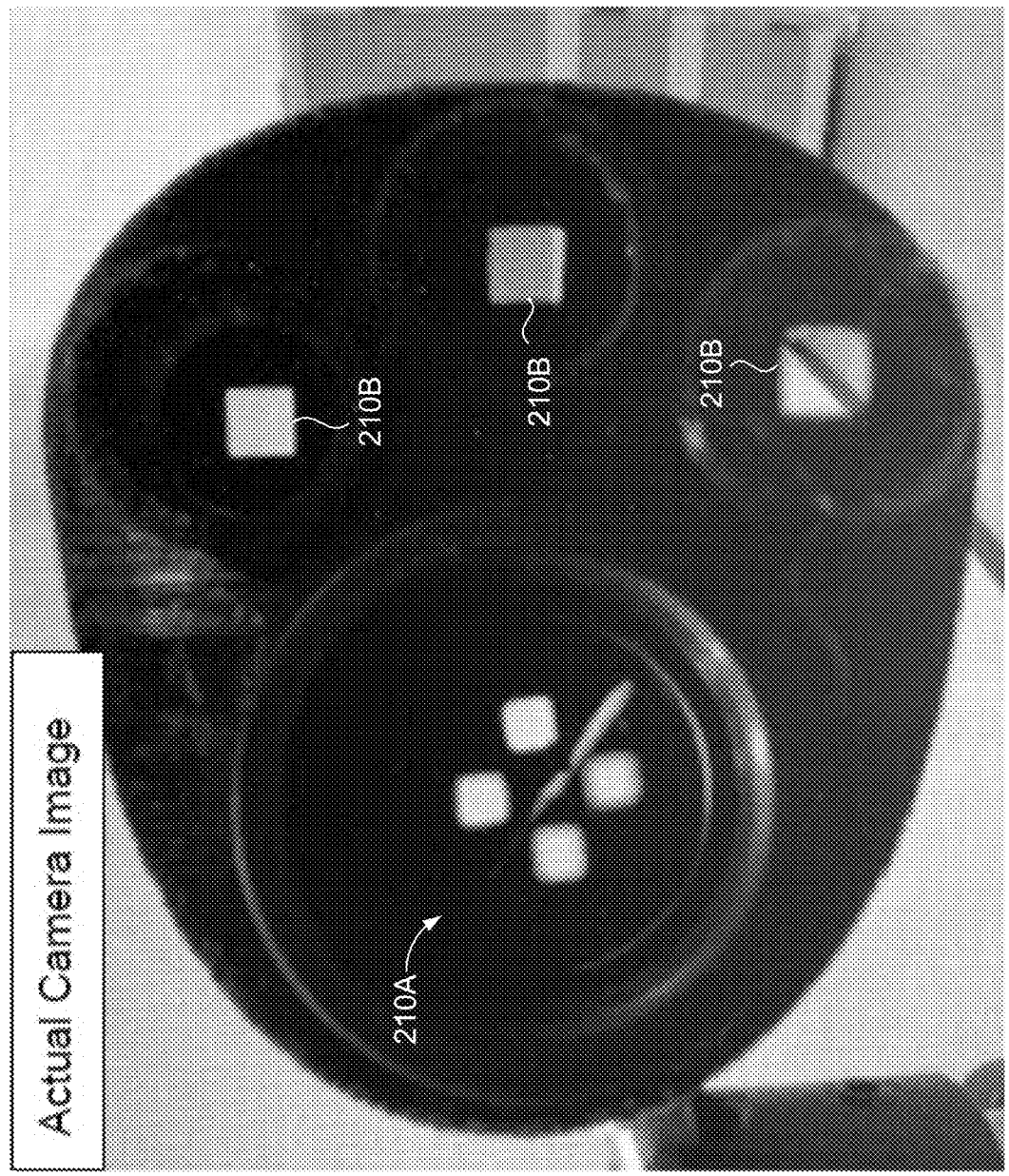
FIG. 3 is a plan view of an exemplary camera image captured by a camera of the defocus tester of FIG. 2.
Figure 4:
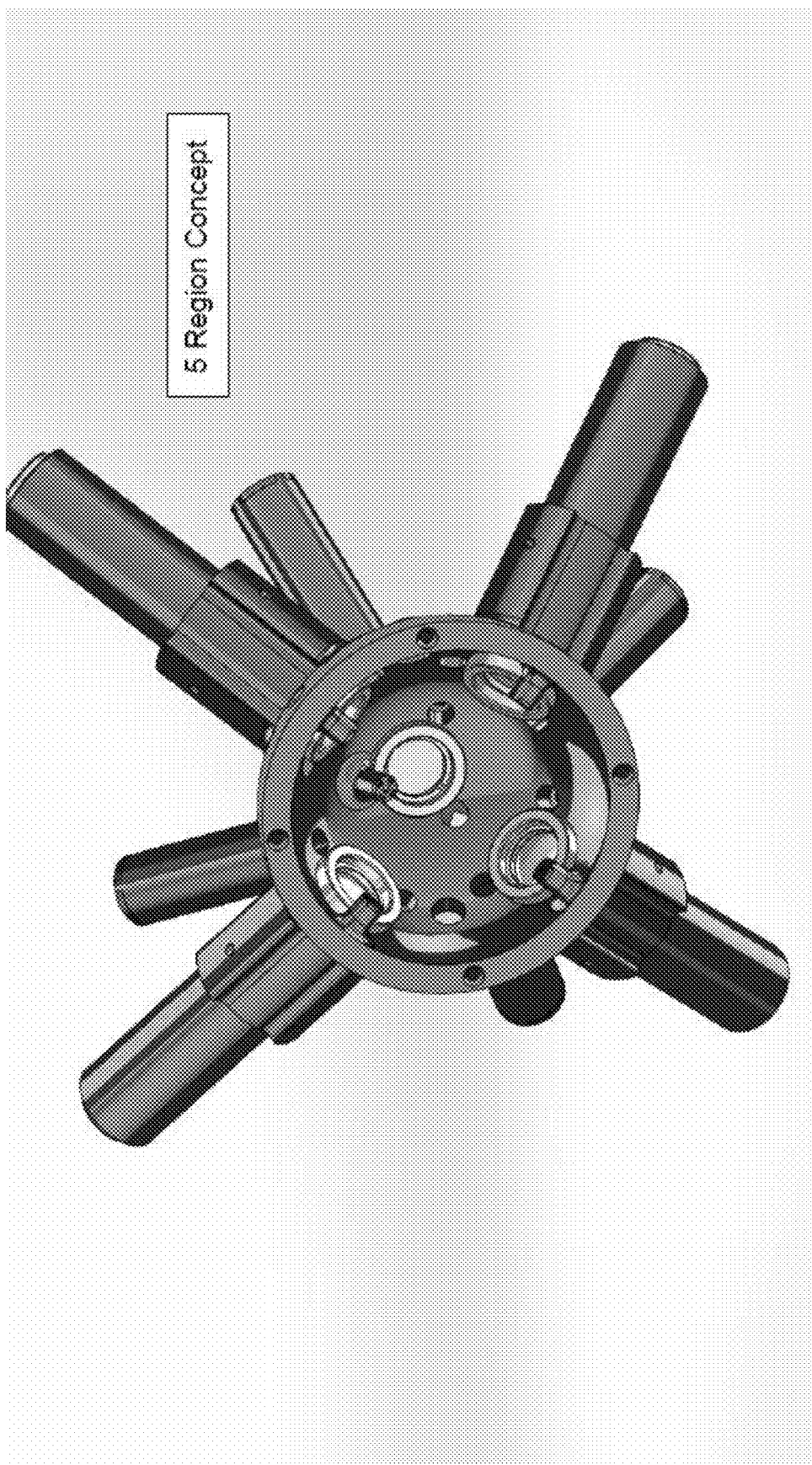
Figure 5:
Figure 6:
Figure 7:

Referring now to FIG. 2, a defocus tester 200 includes at least one target 210A that is placed behind an optic 220. That is, the at least one target 210A measures a simulated distance (based on the optic) that may be different than the actual distance between the target and image sensor. Here there are three targets 210A in view placed behind an optic 220, although the defocus tester 200 may include any number of such targets 210A. The defocus tester also includes at least one target 210B that is not placed behind an optic. That is, the at least one optic 210B measures true image distance. Here, there are three targets 210B without optics. These targets may provide generally small positive image distances. FIG. 3 illustrates an exemplary camera image captured using the defocus tester of FIG. 2. Four targets 210A behind an optic are visible along with three targets 210B that are not behind an optic.

Figure 8:
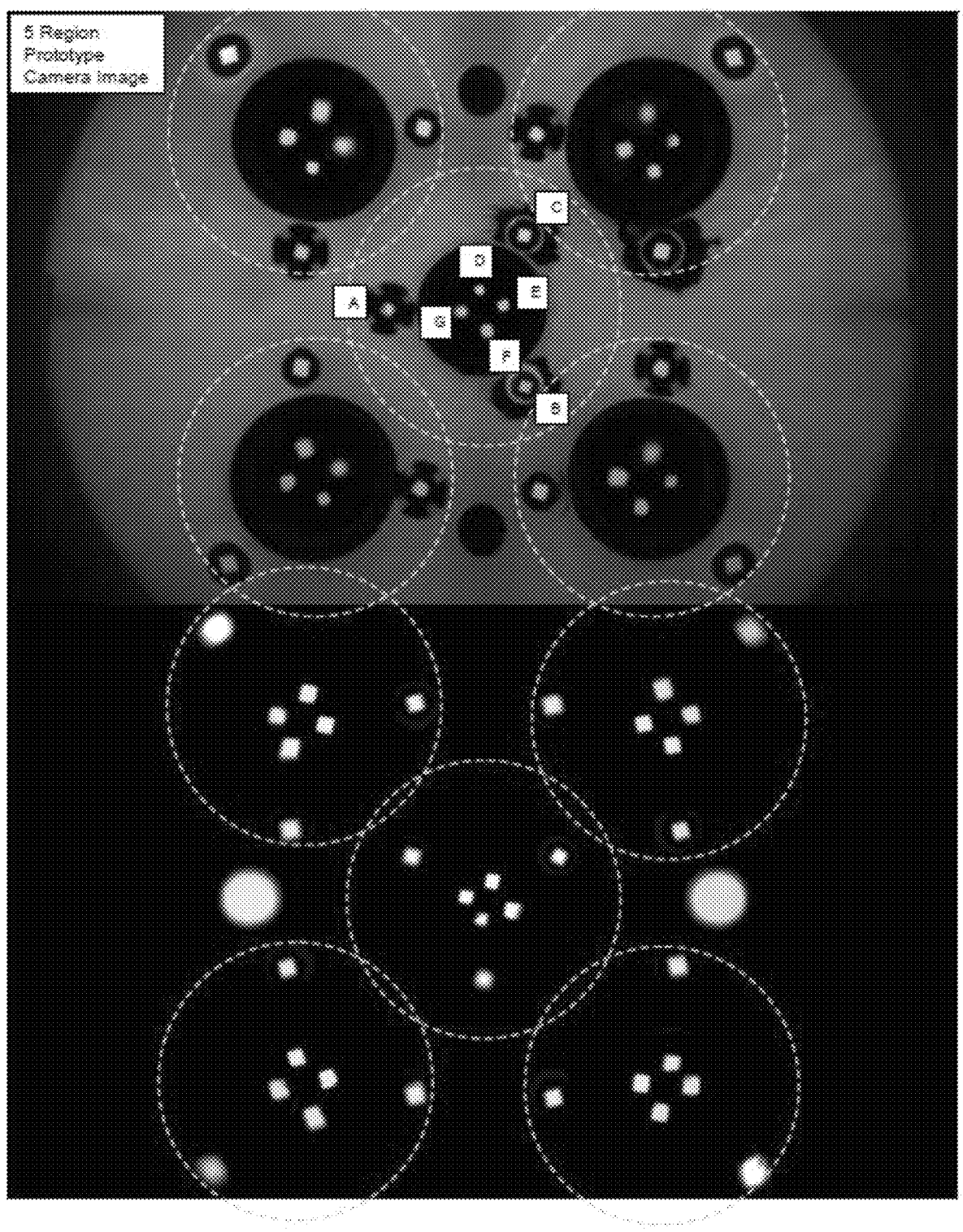
FIG. 8 is a plan view of an exemplary camera image captured by a camera of the defocus tester of FIGS. 3-7.
Figure 9:
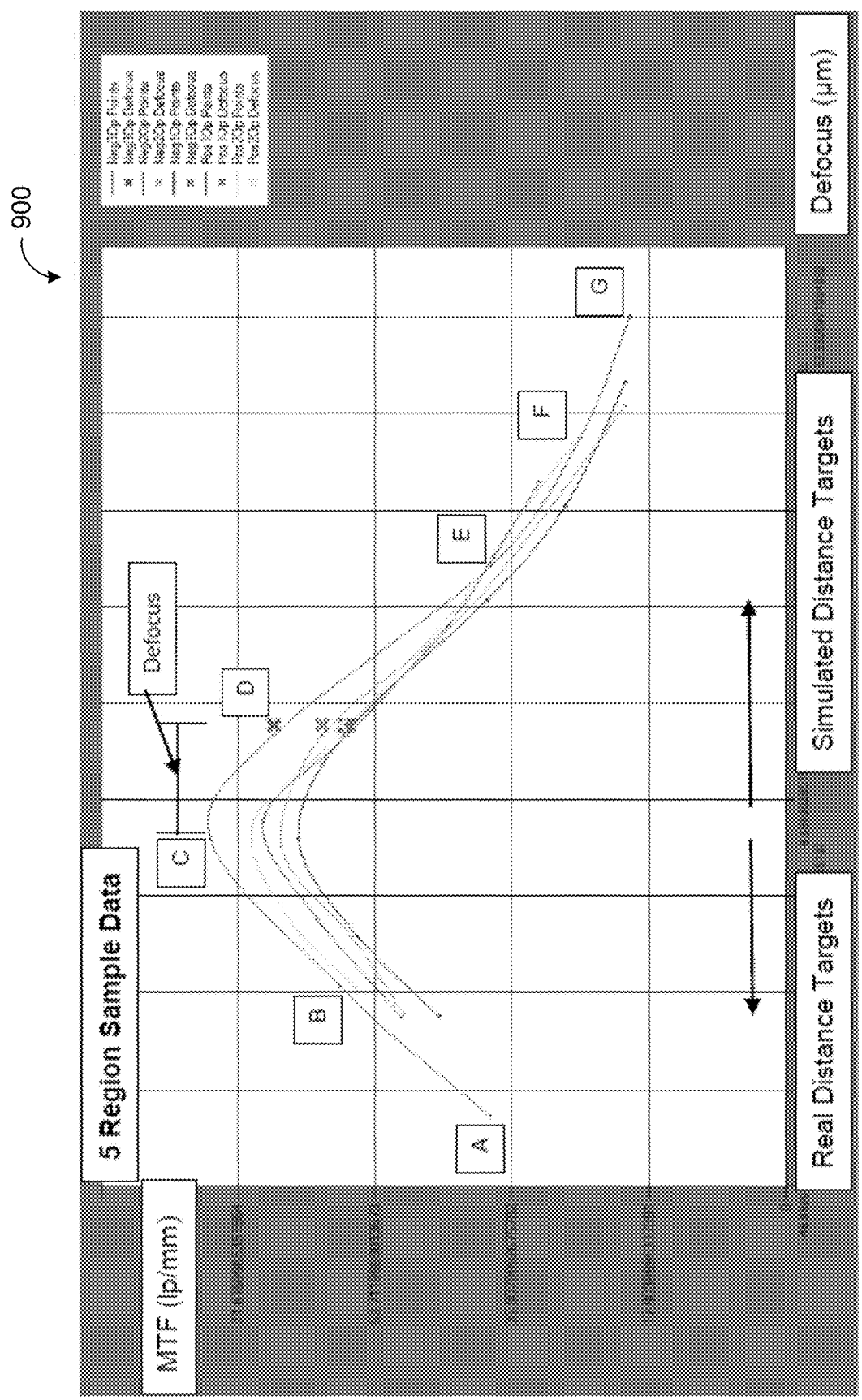
FIG. 9 is a plot of defocus measurements determined by the defocus tester of FIGS. 3-7.

FIGS. 4-7 illustrate a defocus tester with five different regions of targets in different orientations with each region testing the defocus of a different respective region of the camera image. As illustrated in FIG. 8, an image captured by the defocus tester of FIGS. 4-7 illustrates each region including multiple (e.g., seven) targets 210A, 210B, each at varying distances. Here, each region includes a target A, a target B, a target C, a target D, a target E, a target F, and a target G. This allows the camera to be tested at multiple different focus distances (i.e., very close to the camera or very far from the camera) at multiple different regions simultaneously without the need of expensive or unreliable or slow moving parts. FIG. 9 includes graph 900 that demonstrates defocus measurements of a camera using the five region defocus tester of FIGS. 4-7. The defocus at the distance of each target's respective distance (i.e., for targets A-G) for all five regions is plotted and curve-fitted, allowing for easy analysis of the defocus of the camera.

The system thus provides for testing of a camera to determine its degree of defocus using targets and optics. The system may utilize aspects of the systems described in U.S. Pat. No. 10,635,914 and/or U.S. Publication No. US-2020-0204791, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224;

7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of testing a vehicular camera, the method comprising:
   providing the vehicular camera configured for use on a vehicle;
   providing a defocus tester, the defocus tester comprising a first target disposed behind an optic and a second target that is not disposed behind the optic;
   positioning the defocus tester relative to the vehicular camera such that the vehicular camera views the defocus tester and images (i) light that has reflected off the first target disposed behind the optic and has passed through the optic and (ii) light that has reflected off the second target and has not passed through the optic;
   wherein the first target has a simulated distance relative to the vehicular camera that is different than an actual distance of the first target relative to the vehicular camera;
   wherein the simulated distance relative to the vehicular camera of the first target is different than an actual distance of the second target relative to the vehicular camera;
   capturing image data with the vehicular camera, wherein the captured image data is representative of the first target and the second target; and
   estimating a defocus of the vehicular camera responsive to processing, via an image processor, the image data captured by the vehicular camera with the defocus tester positioned such that the vehicular camera views the defocus tester.

2. The method of claim 1, further comprising providing a third target behind the optic, wherein the third target has a simulated distance relative to the vehicular camera that is different than an actual distance of the third target relative to the vehicular camera, and wherein positioning the defocus tester comprises positioning the defocus tester such that light that has reflected off the third target disposed behind the optic passes through the optic.

3. The method of claim 1, wherein the defocus tester comprises three additional targets that are disposed behind the optic, and wherein the three additional targets each have a respective simulated distance relative to the vehicular camera that is different than a respective actual distance relative to the vehicular camera, and wherein positioning the defocus tester comprises positioning the defocus tester such that light that has reflected off each of the three additional targets disposed behind the optic passes through the optic, and wherein the defocus tester comprises two additional targets that are not disposed behind the optic, and wherein positioning the defocus tester comprises positioning the defocus tester such that light that has reflected off each of the two additional targets that are not disposed behind the optic does not pass through the optic.

4. The method of claim 1, wherein the first target disposed behind the optic and the second target that is not disposed behind the optic combine to form a testing region, and wherein the defocus tester comprises a plurality of testing regions.

5. The method of claim 4, wherein the defocus tester comprises five testing regions.

6. The method of claim 5, wherein each testing region estimates a defocus of the vehicular camera at a different respective region of the image data.

7. The method of claim 1, wherein the first target and the second target each comprise a modulus transfer function (MTF) target.

8. The method of claim 1, wherein the defocus tester does not comprise any moving parts.

9. The method of claim 1, wherein the actual distance of the second target relative to the vehicular camera is less than a minimum simulated distance of the first target relative to the vehicular camera based on focal properties of the optic.

10. The method of claim 1, wherein the defocus tester comprises a third target disposed behind a second optic, and wherein the third target has a simulated distance relative to the vehicular camera that is different than an actual distance of the third target relative to the vehicular camera, and wherein positioning the defocus tester comprises positioning the defocus tester such that light that has reflected off the third target disposed behind the second optic passes through the second optic.

11. The method of claim 1, wherein the defocus tester comprises a third target that is not disposed behind the optic, and wherein positioning the defocus tester comprises positioning the defocus tester such that light that has reflected off the third target that is not disposed behind the optic does not pass through the optic.

12. A method of testing a vehicular camera, the method comprising:
   providing the vehicular camera configured for use on a vehicle;
   providing a defocus tester, the defocus tester comprising (i) a first set of targets, with each target of the first set of targets disposed behind an optic, and (ii) a second set of targets, with each target of the second set of targets not disposed behind the optic;

positioning the defocus tester relative to the vehicular camera such that the vehicular camera views the defocus tester and images (i) light that has reflected off the first set of targets disposed behind the optic and has passed through the optic and (ii) light that has reflected off the second set of targets and has not passed through the optic;

wherein each respective target of the first set of targets has a simulated distance relative to the vehicular camera that is different than an actual distance of the respective target of the first set of targets relative to the vehicular camera;

wherein the respective simulated distance relative to the vehicular camera of each of the targets of the first set of targets is different than an actual distance of each other target of the first set of targets and each target of the second set of targets relative to the vehicular camera;

capturing image data with the vehicular camera, wherein the captured image data is representative of each of the targets of the first set of targets and each of the targets of the second set of targets; and estimating a defocus of the vehicular camera responsive to processing, via an image processor, the image data captured by the vehicular camera with the defocus tester positioned such that the vehicular camera views the defocus tester.

13. The method of claim 12, wherein the first set of targets comprises four targets.

14. The method of claim 12, wherein the second set of targets comprises three targets.

15. The method of claim 12, wherein at least one target of the first set of targets and at least one target of the second set of targets comprise a modulus transfer function (MTF) target.

16. The method of claim 12, wherein the defocus tester does not comprise any moving parts.

17. A defocus tester for a vehicular camera, the defocus tester comprising:

a first target disposed behind an optic, wherein the first target has a simulated distance relative to the vehicular camera that is different than an actual distance of the first target relative to the vehicular camera;

a second target that is not disposed behind the optic;

wherein the simulated distance relative to the vehicular camera of the first target is different than an actual distance of the second target relative to the vehicular camera; and wherein, when testing a defocus of the vehicular camera, the defocus tester images (i) light that has reflected off the first target disposed behind the optic and has passed through the optic and (ii) light that has reflected off the second target and has not passed through the optic.

18. The defocus tester of claim 17, wherein the vehicular camera captures image data representative of the first target and the second target.

19. The defocus tester of claim 17, wherein a processor, based on processing of image data captured by the vehicular camera positioned such that the vehicular camera views the defocus tester, estimates a defocus of the vehicular camera.

20. The defocus tester of claim 17, further comprising providing a third target behind the optic, wherein the third target has a simulated distance relative to the vehicular camera that is different than an actual distance of the third target relative to the vehicular camera, and wherein positioning the defocus tester comprises positioning the defocus tester such that light that has reflected off the third target disposed behind the optic passes through the optic.

* * * * *